(12) United States Patent
Kemp

(10) Patent No.: US 7,427,767 B2
(45) Date of Patent: Sep. 23, 2008

(54) APPARATUS FOR IDENTIFYING THE CONDITION OF A CONVEYOR BELT

(75) Inventor: Jean-Claude Kemp, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/562,722

(22) Filed: Nov. 22, 2006

(65) Prior Publication Data

US 2007/0145308 A1    Jun. 28, 2007

(30) Foreign Application Priority Data

Nov. 22, 2005  (DE) ................ 10 2005 055 655

(51) Int. Cl.
*G01N 21/00* (2006.01)
*G01N 21/89* (2006.01)
*B65G 43/00* (2006.01)

(52) U.S. Cl. .................. 250/559.39; 250/559.05; 250/559.07; 250/559.4; 250/559.45; 250/223 R; 198/502.1; 198/810.01; 198/810.02; 198/810.03; 356/429; 356/430; 356/237.1; 356/237.2; 356/239.7

(58) Field of Classification Search ........... 250/221, 250/222.1, 223 R, 224, 559.05, 559.07, 559.08, 250/559.39–559.46; 356/237.1–237.3, 239.1, 356/239.7, 239.8, 429, 430; 198/341.03, 198/341.07, 460.1, 464.2, 502.1–502.4, 810.01–810.03

See application file for complete search history.

(56) References Cited

U.S. PATENT DOCUMENTS

| | | | | |
|---|---|---|---|---|
| 6,032,787 | A * | 3/2000 | Kellis ................ | 198/810.02 |
| 6,291,991 | B1 * | 9/2001 | Schnell ............... | 324/235 |
| 6,781,515 | B2 * | 8/2004 | Kuzik et al. .......... | 340/676 |
| 6,831,566 | B1 * | 12/2004 | Kusel ................. | 340/676 |
| 6,979,815 | B2 * | 12/2005 | Duhamel .............. | 250/223 R |
| 6,988,610 | B2 * | 1/2006 | Fromme et al. ......... | 198/502.1 |
| 7,259,854 | B2 * | 8/2007 | Schnell ............... | 356/430 |
| 2003/0000808 | A1 * | 1/2003 | Kusel ................. | 198/502.1 |
| 2003/0168317 | A1 | 9/2003 | Fromme et al. ......... | 198/502.1 |
| 2006/0114452 | A1 | 6/2006 | Schnell ............... | 356/237.1 |

FOREIGN PATENT DOCUMENTS

| | | |
|---|---|---|
| DE | 3517314 | 1/1986 |
| DE | 102004041705 | 3/2005 |

* cited by examiner

*Primary Examiner*—Davienne Monbleau
(74) *Attorney, Agent, or Firm*—Baker Botts L.L.P.

(57) ABSTRACT

An apparatus for identifying the condition of a conveyor belt (6) has a capturing device (12) which can be used to capture two-dimensional images (B) of successive belt sections (15) of the conveyor belt (6) during operation of the conveyor belt (6). The capturing device (12) and the evaluation device (13) have a data-processing connection, so that the captured images (B) can be transmitted to the evaluation device (13). The evaluation device (13) compares the images (B) transmitted to it with two-dimensional reference images (R) which are associated with the belt sections (15), determines at least one statement about the condition of the belt on the basis of the comparison, and outputs the statement about the condition of the belt.

20 Claims, 4 Drawing Sheets

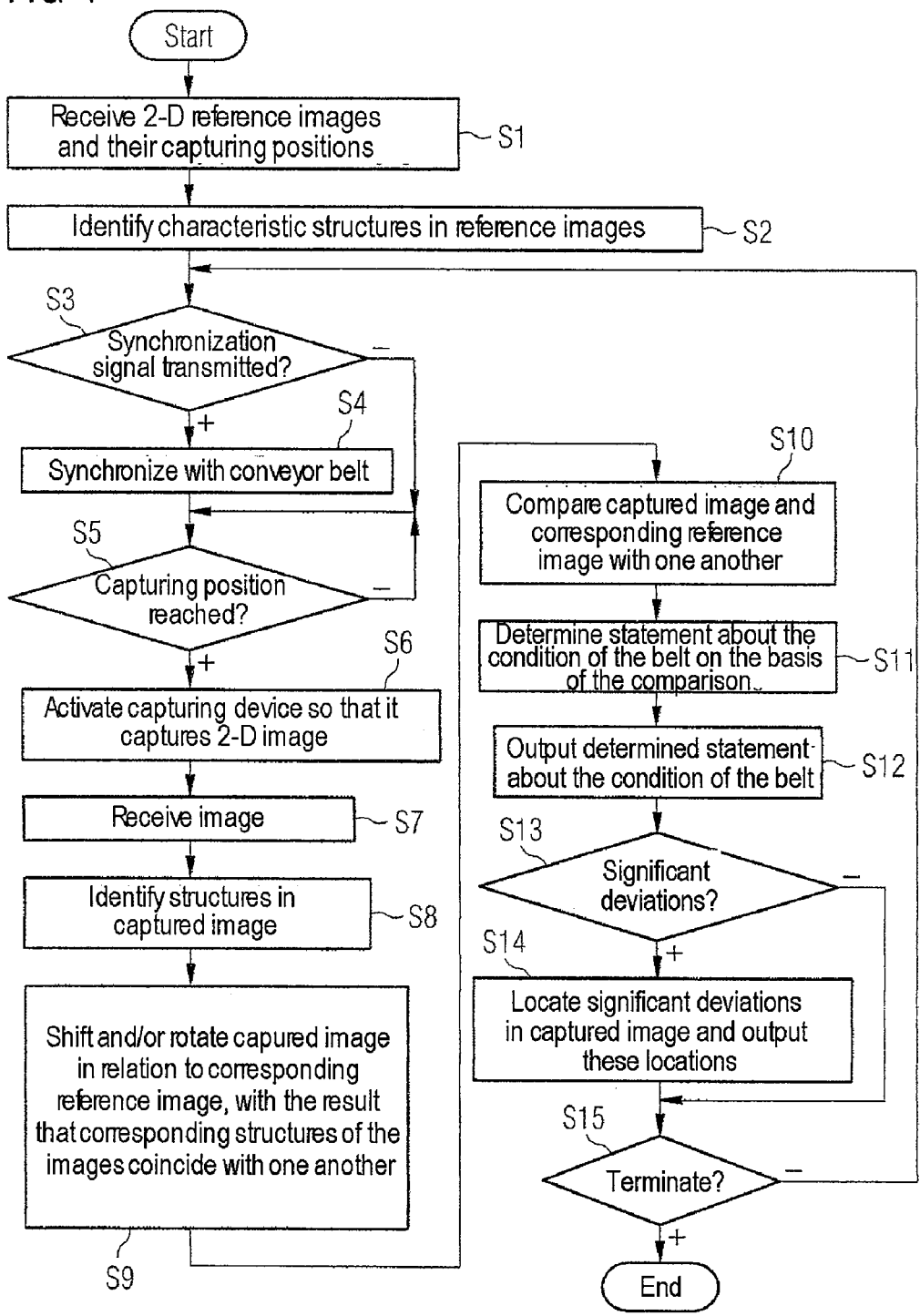

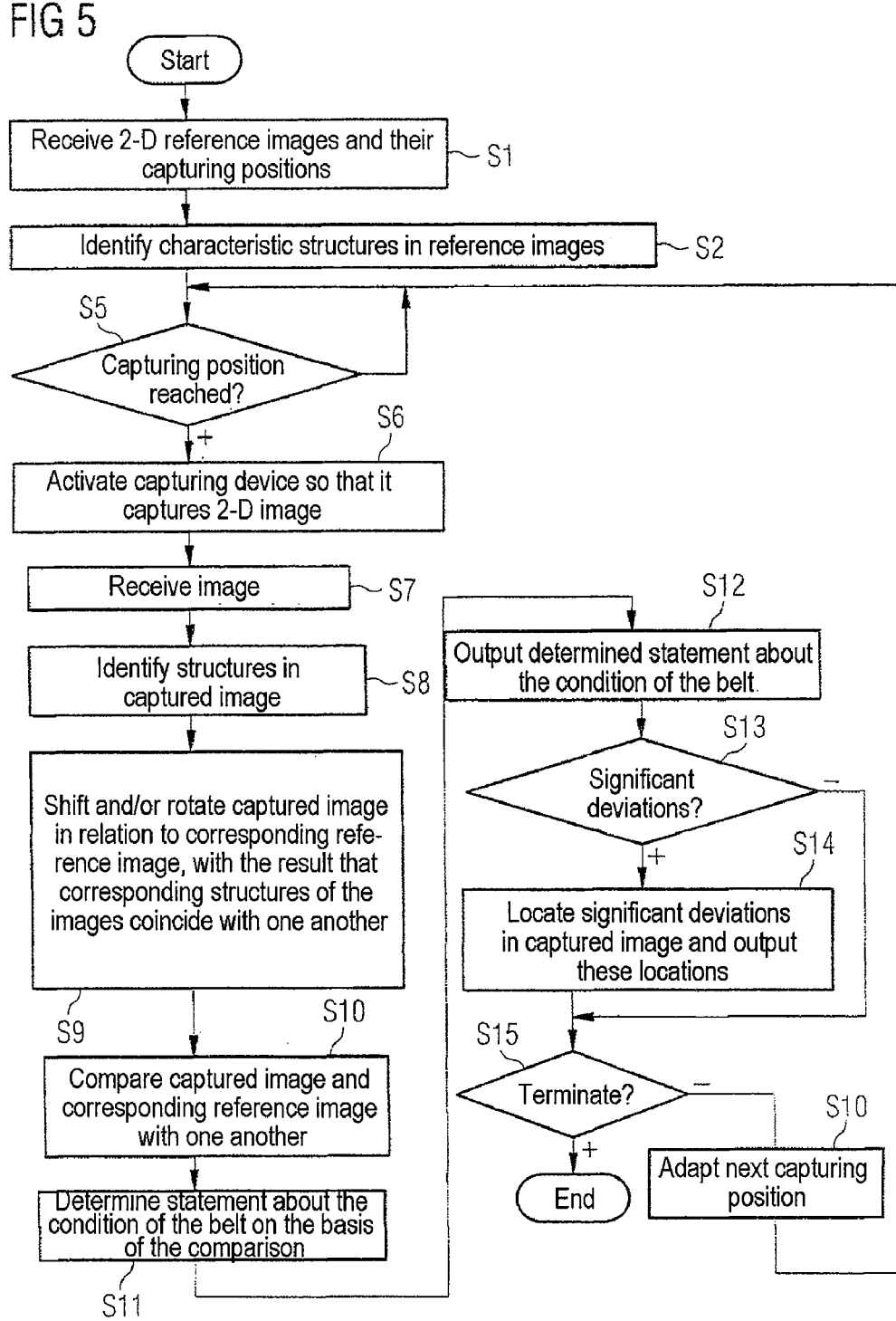

APPARATUS FOR IDENTIFYING THE CONDITION OF A CONVEYOR BELT

CROSS-REFERENCE TO RELATED APPLICATIONS

This application claims priority from German Patent Application No. DE 10 2005 055 655.8, which was filed on Nov. 22, 2005, and is incorporated herein by reference in its entirety.

TECHNICAL FIELD

The present invention relates to an apparatus for identifying the condition of a conveyor belt. In this case, "condition of a conveyor belt" is to be understood as a condition which is independent of the circulation of the conveyor belt. This therefore does not concern a statement about where a specific point of the conveyor belt is situated or how the conveyor belt is moving, but instead a statement about a static or only very slowly changing condition, an abruptly changing condition and the like.

BACKGROUND

Many refinements of conveyor belts are used. In the simplest case, a conveyor belt comprises a simple rubber belt which is guided over two deflection rollers, with one of the deflection rollers being driven. Support rollers, which do not have a drive, are then arranged between the deflection rollers. In other cases, the conveyor belt comprises one or two conveyor chains or one or two conveyor cables on which individual conveyor segments which are not directly connected to one another are mounted such that they adjoin one another. Other refinements are also possible and are used—depending on the application. One example of a refinement of this type includes individual segments which are connected to one another in an articulated manner.

Conveyor belts are used in many applications, including in mining (overground and underground), in primary industries (for example iron smelting) and in other cases in which, for example, bulk materials have to be transported. In these applications in particular, the conveyor belts used are often subjected to high loads and this consequently leads to wear. Maintenance costs may be considerable here. Damage to the conveyor belt which is not identified in good time may lead to the entire conveyor line (for example from a mining site to a bunker) malfunctioning.

The prior art discloses carrying out belt inspections in order to prevent such malfunctions. However, belt inspections can only be carried out when the conveyor belt is at a standstill (that is to say not continuously). Belt inspections are also time-consuming and labor-intensive and furthermore result in only subjective assessment of the condition of the conveyor belt. Depending on the experience of the person carrying out the belt inspection, it is possible that damage may not be identified and/or wear reserves may not be depleted.

In order to be able to make a reliable statement about the condition of the conveyor belt, it is necessary, in particular, to reliably identify damage at the edges of the conveyor belt, damage to the elements which absorb forces in the conveying direction (for example longitudinal cables and/or connecting sections between belt sections) and other quality factors of the individual belt sections of the conveyor belt.

Furthermore, the prior art already discloses arranging an ultrasonic detector on either side of the conveyor belt for this purpose, it being possible to use said ultrasonic detector to detect damage to the edges during operation of the conveyor belt.

It is also known to use a camera system to record damage to the belt, which has already been detected, for documentation purposes.

SUMMARY

The object of the present invention is to provide an apparatus which can be used to reliably and objectively record not only damage to the edges of the conveyor belt but also other conditions of the conveyor belt, in particular damage.

The object is achieved by an apparatus for identifying the condition of a conveyor belt, in which the apparatus has a capturing device which can be used to capture two-dimensional images of successive belt sections of the conveyor belt during operation of the conveyor belt, in which the capturing device and an evaluation device have a data-processing connection, so that the captured two-dimensional images can be transmitted to the evaluation device, and in which the evaluation device is formed in such a way that it compares the two-dimensional images transmitted to it with two-dimensional reference images which are associated with the belt sections, determines at least one statement about the condition of the belt on the basis of the comparison, and outputs the statement about the condition of the belt.

BRIEF DESCRIPTION OF THE DRAWINGS

Further advantages and details can be found in the following description of one exemplary embodiment in conjunction with the drawings, in which, in basic illustrations:

FIGS. 4 and 5 show flowcharts.

DETAILED DESCRIPTION

Figure 1:
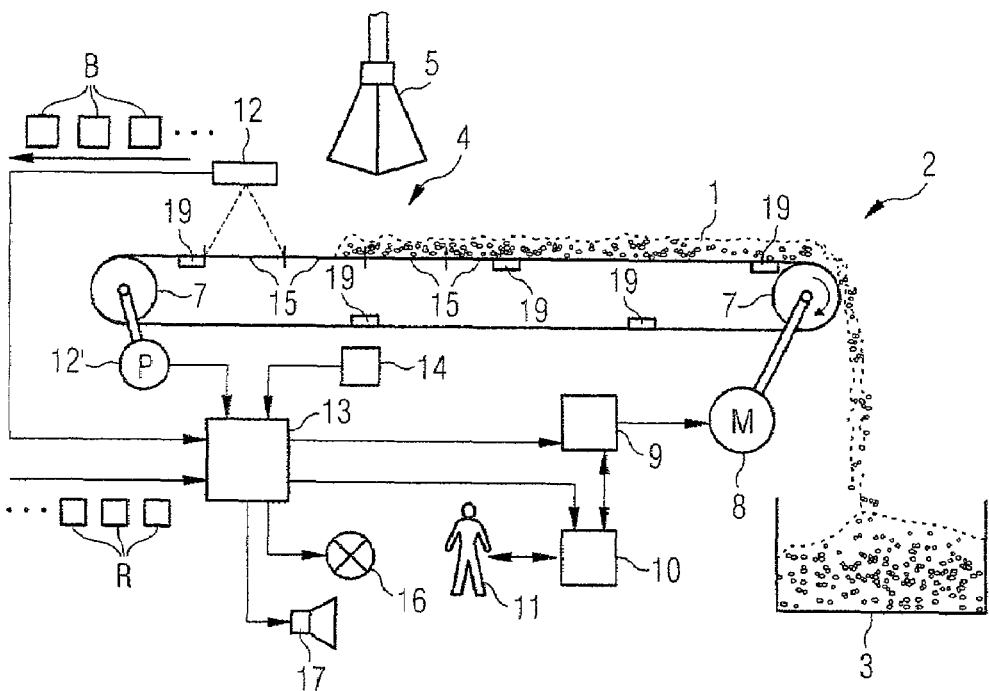
FIG. 1 schematically shows a conveyor system having an apparatus for identifying the condition of a conveyor belt.

In an embodiment, the capturing device may not have its own associated radiation source, with the capturing device therefore capturing only scattered radiation or other radiation which is emitted by the belt sections. However, in an embodiment, the capturing device preferably has an associated radiation source whose radiation can be captured by the capturing device.

In an embodiment, the capturing device and the radiation source may be arranged on the same side of the conveyor belt. In this case, the radiation used may, in particular, be electromagnetic radiation (that is to say visible, infrared or ultraviolet light) and also ultrasound. However, in an embodiment, it is also possible for the capturing device and the radiation source to be arranged on different sides of the conveyor belt, and for the radiation emitted by the radiation source to penetrate the conveyor belt. The use of penetrating radiation particularly has the advantage that internal damage to the conveyor belt can also be identified at an early stage. In an embodiment, penetrating radiation may, in particular, be X-ray radiation. However, in an embodiment, if appropriate, it is also possible to use infrared or ultraviolet radiation, and possibly even ultrasound.

In an embodiment, the belt sections which correspond to the two-dimensional images captured by the capturing device and the belt sections which correspond to the two-dimensional reference images should coincide as far as possible. In an embodiment, the evaluation device is therefore preferably formed in such a way that it is synchronized with the conveyor belt at least once per revolution of the conveyor belt.

In an embodiment, it is possible for the evaluation device to be formed in such a way that it is automatically synchronized on the basis of the comparison of the captured two-dimensional images with the two-dimensional reference images. However, it is also possible, in an alternative embodiment, for the apparatus to have a synchronization element which can be used to detect when at least one predetermined belt section passes the synchronization element, and for the synchronization element and the evaluation device to have a data-processing connection in order to transmit a corresponding synchronization signal to the evaluation device.

In an embodiment, the capturing device is preferably arranged in such a way that the two-dimensional images captured by the capturing device show the corresponding belt sections in the condition without bulk material since it is possible to evaluate the captured two-dimensional images in a particularly effective and reliable manner in this case.

In an embodiment, the statement about the condition of the belt can be output in various ways. For example, the evaluation device can output the statement about the condition of the belt to a control device for the conveyor belt. In this case, it is possible to directly influence the conveyor belt (for example stop the conveyor belt) if this should be required on the basis of the statement about the condition of the belt. As an alternative or in addition, it is possible for the evaluation device to transmit the statement about the condition of the belt to an operator control computer. In this case, an operator can call up said statement about the condition of the belt from the operator control computer as required. Furthermore, it is also alternatively or additionally possible for the evaluation device to activate an output device as a function of the statement about the condition of the belt, it being possible for a person to directly perceive the output signal from said output device using one of his sense organs. In this case, an operator can perceive a corresponding condition of the conveyor belt without any further action, so that he can take the required measures if appropriate.

In an embodiment, the statement about the condition of the belt is preferably an alarm, a statement about the degree of wear, damage to the belt, remaining service life and/or soiling of the conveyor belt. In this case, the degree of wear is output in percent and damage is preferably broken down into location and type. The remaining service life is output in the unit "time". Soiling is preferably output depending on location and/or severity (percent or in grades).

In an embodiment, even better and more comprehensive information about the condition of the conveyor belt is provided if the evaluation device locates significant deviations in the captured two-dimensional images between said captured two-dimensional images and the two-dimensional reference images and outputs the location of the significant deviations.

In an embodiment, the captured two-dimensional images and the two-dimensional reference images are generally pictures. The evaluation device is therefore preferably formed in such a way that it identifies corresponding structures in the captured two-dimensional images and the two-dimensional reference images and shifts and/or rotates the captured two-dimensional images in relation to the two-dimensional reference images before they are compared with said two-dimensional reference images, with the result that the corresponding structures coincide with one another.

According to FIG. 1, the intention is to convey—purely by way of example—bulk material 1 (for example coal or ore) to a bunker 3 by means of a conveyor device 2. To this end, the bulk material 1 is loaded onto the conveyor device 2 at a feed location 4. The manner in which the bulk material 1 is loaded onto the conveyor device 2 by means of a gripper 5, as illustrated in FIG. 1, is purely exemplary in this case.

According to FIG. 1, the conveyor device 2 has a conveyor belt 6. The conveyor belt 6 is guided over two deflection rollers 7, with one of the deflection rollers 7 being driven by means of a drive 8. The drive 8 is controlled by a control device 9. The control device 9 is, in turn, connected to an operator control computer 10 which an operator 11 can use, inter alia, to detect and influence the operating state of the conveyor system.

The conveyor belt 6 is subject to wear during operation. According to the invention, the conveyor device 2 therefore has an associated apparatus for identifying the condition of the conveyor belt 6. This apparatus has a capturing device 12, a position sensor 12', an evaluation device 13 and optionally a synchronization element 14. In this case, the evaluation device 13 has a data-processing connection to the capturing device 12, the position sensor 12' and also the synchronization element 14 if present.

The apparatus uses the capturing device 12 to capture two-dimensional images B of successive sections 15 of the conveyor belt 6. In this case, said images are captured during operation of the conveyor belt 6. The capturing device 12 transmits the captured two-dimensional images B to the evaluation device 13.

The evaluation device 13 compares the two-dimensional images B transmitted to it with two-dimensional reference images R. The two-dimensional reference images R are likewise associated with the belt sections 15 here. A 1:1 association generally prevails, so that each reference image R is associated with exactly one belt section 15 and, conversely, exactly one reference image R is associated with each belt section 15.

The evaluation device 13 therefore identifies the corresponding two-dimensional reference image R for each captured two-dimensional image B and compares each captured two-dimensional image B with the corresponding two-dimensional reference image R. In this case, the evaluation device 13 uses a position signal transmitted by the position sensor 12' to identify which of the reference images R corresponds with the image B captured last in each case. Said evaluation device determines a statement about the condition of the belt on the basis of the comparison, and outputs the statement about the condition of the belt.

It is possible for the evaluation device 13 to output the statement about the condition of the belt directly to the control device 9. In this case, the control device 9 is able to take the statement about the condition of the belt into account when actuating the conveyor device 2 if appropriate. For example, said control device may stop the conveyor belt 6 if there would otherwise be a risk of damage.

As an alternative or in addition, it is also possible for the evaluation device 13 to output the statement about the condition of the belt to the operator control computer 10. Said statement about the condition of the belt can then be immediately output to the operator 11 on said operator control computer—for example via a display unit. However, it is also possible for the statement about the condition of the belt to only be stored in the operator control computer 10. In this case, it is necessary, for the purpose of displaying the statement about the condition of the belt, for the operator 11 to issue a corresponding call-up command on the operator control computer 10 and thus call up the statement about the condition of the belt.

Again alternatively or in addition, it is also possible for the evaluation device 13 itself to activate an output device 16, 17. The output device 16, 17 may, for example, be a lighting device 16 or a display. Said output device may also be an acoustic alarm 17. In both cases, the operator 11 (or another person) can directly perceive the output signal output by the output device 16, 17 using one of his sense organs.

Figure 2:
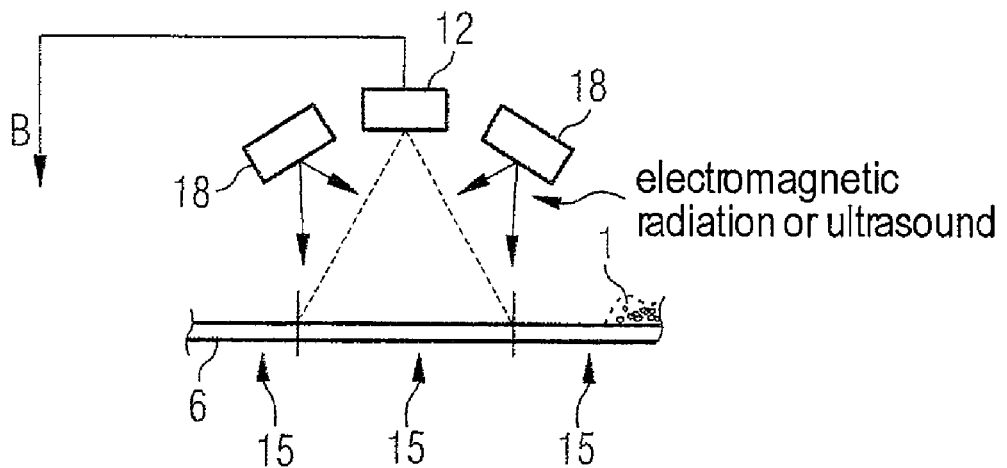
FIGS. 2 and 3 show possible refinements of a capturing arrangement.

According to FIG. 2, the capturing device 12 has an associated radiation source 18. According to FIG. 2, the radiation source 18 is arranged on the same side of the conveyor belt 6 as the capturing device 12. Said radiation source emits, for example, electromagnetic radiation in the visible range (wavelength of approximately 400 to 700 nanometers, "light"), in the infrared range or in the ultraviolet range. It is also possible for said radiation source to emit ultrasound. However, in each of these cases, the capturing device 12 is formed in such a way that it can capture the emitted radiation. It is therefore designed, for example, as a camera for the corresponding wavelength range or as an ultrasound detector. In addition, the two-dimensional images B captured by the capturing device 12 are pictures B in each of these cases. Since the two-dimensional reference images R furthermore correspond with the captured two-dimensional images B, the two-dimensional reference images R are also pictures.

Figure 3:
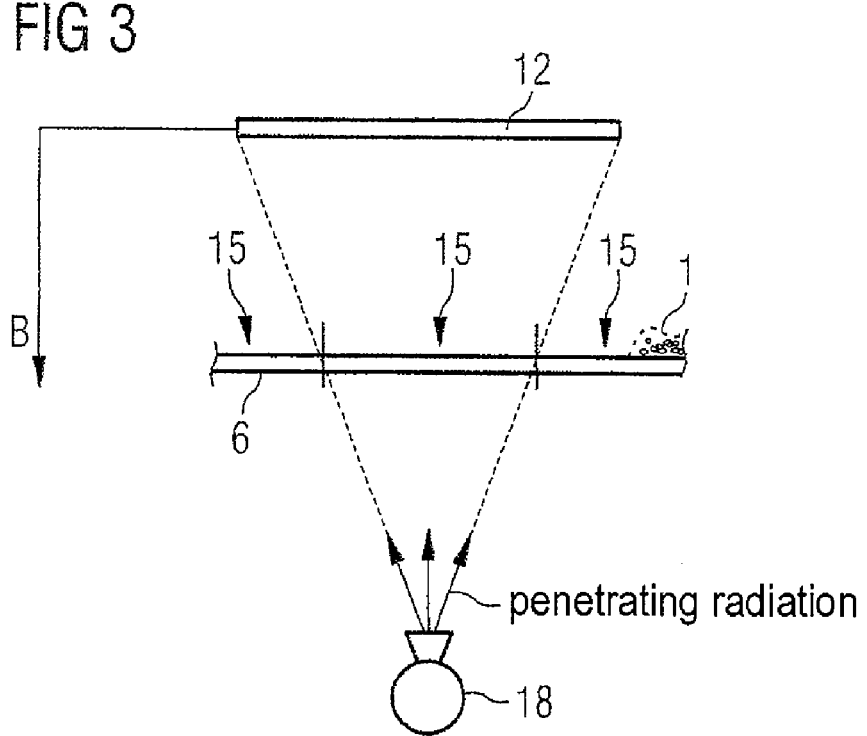

The capturing device 12 also has an associated radiation source 18 in accordance with FIG. 3. The radiation emitted by the radiation source 18 can again be captured by the capturing device 12. However, according to FIG. 3, the capturing device 12 and the radiation source 18 are arranged on different sides of the conveyor belt 6. In this case, the radiation emitted by the radiation source 18 must be able to penetrate the conveyor belt 6. A typical example of radiation of this type is X-ray radiation. However, it could optionally be infrared or ultraviolet radiation too.

In the case of FIG. 3, the two-dimensional images B are projection images, that is to say likewise pictures. It goes without saying that the same must again apply to the two-dimensional reference images R.

The arrangement of the capturing device 12—with the radiation source 18 or without the radiation source 18—can be freely selected within wide limits. However, it should be set in such a way that the two-dimensional images B captured by the capturing device 12 show the corresponding belt sections 15 in a state in which there is no material 1 being conveyed on the belt sections (15) (state without material being conveyed).

The way in which the apparatus according to the invention operates is explained again below in conjunction with FIGS. 4 and 5.

According to FIG. 4, the evaluation device 13 first receives the two-dimensional reference images R from the capturing device 12 and their capturing positions from the position sensor 12' in a step S1. The two-dimensional reference images R show, for example, the individual belt sections 15 in an initial state, for example after the conveyor belt 6 is newly installed.

In a step S2, the evaluation device 13 identifies characteristic structures in the reference images R. In the case of X-ray images, the structures may, for example, correspond to the profile of steel reinforcements in the belt sections 15.

According to FIG. 1, the conveyor belt 6 has a synchronization marking 19 at at least one predetermined point. According to FIG. 1, even a plurality of such synchronization markings 19 are provided. Each synchronization marking 19 is arranged, for example, at the start of a predetermined belt section 15. Each time one of the synchronization markings 19 (or the corresponding belt section 15) passes the synchronization element 14, said synchronization element 14 detects this. In this case, the synchronization element 14 transmits a corresponding synchronization signal to the evaluation device 13. The evaluation device 13 can therefore be synchronized with the conveyor belt 6.

The number of synchronization markings 19 corresponds to the number of synchronization processes for each revolution of the conveyor belt 6. Therefore, at least one synchronization process takes place for each revolution of the conveyor belt 6 when synchronization markings 19 are used.

On account of the above-described external synchronization by the synchronization element 14, the evaluation device 13 checks, in a step S3, whether a synchronization signal has been transmitted to it by the synchronization element 14. If this is the case, the evaluation device 13 is synchronized with the conveyor belt 6 in a step S4, Otherwise, the evaluation device 13 jumps directly to a step S5.

In step S5, the evaluation device 13 waits for the conveyor belt 6 to reach the next position at which a two-dimensional image B is again intended to be captured by the capturing device 12. The capturing positions are known to the evaluation device 13 from step S1. The position sensor 12' supplies the current position.

When the respective capturing position is reached, the evaluation device 13 activates the capturing device 12 in a step S6, so that the capturing device 12 captures the two-dimensional image B of the corresponding belt section 15 and transmits it to the evaluation device 13. The evaluation device 13 receives this two-dimensional image B in a step S7.

In a step S8, the evaluation device 13 identifies the structures in the captured and transmitted two-dimensional image B. In a step S9, the evaluation device 13 shifts and/or rotates the captured two-dimensional image B in relation to the corresponding two-dimensional reference image R, with the result that the corresponding structures of the captured two-dimensional image B and the corresponding two-dimensional reference image R coincide with one another. As a result, it is possible to compensate, in particular, for congruency errors which are caused by lateral migration of the conveyor belt 6 and any synchronization error which may have occurred since the last synchronization process.

In a step S10, the evaluation device 13 compares the captured two-dimensional image B and the corresponding two-dimensional reference image R. In particular, this may involve subtracting one of the two two-dimensional images B, R from the other during step S10.

In a step S11, the evaluation device 13 determines a statement about the condition of the belt on the basis of the comparison. For example, it may make a statement about the degree of wear, any possible damage to the belt, the remaining service life and/or soiling of the conveyor belt 6. If appropriate, it may also determine an alarm.

In a step S12, the evaluation device 13 outputs the determined statement about the condition of the belt. In this case—if desired—the statement can be output to the control device 9 and/or the operator control computer 10 and/or directly to the operator 11 by activating the display device 16, 17.

In a step S13, the evaluation device 13 checks whether the captured two-dimensional image B has deviated significantly from the corresponding two-dimensional reference image R during the comparison (see step S10). If this is the case, the evaluation device 13 jumps to a step S14 in which it locates the significant deviations in the respective captured two-dimensional image B. These locations are also output. It is also possible to determine and output the type of deviation if desired. The locations of the significant deviations and the types of significant deviations are preferably output to the operator control computer 10 and/or via a display device.

Finally, the evaluation device 13 checks once again, in a step S15, whether further execution of the method should be terminated. If this is not the case, the evaluation device 13 jumps back to step S3. Otherwise, it terminates execution of the method.

In the procedure described above in conjunction with FIG. 4, the evaluation device 13 is externally synchronized by means of the synchronization element 14 and the synchronization markings 19. However, it is also possible for the evaluation device 13 to be automatically synchronized on the basis of the comparison of the captured two-dimensional images B with the two-dimensional reference images R. In this case, the procedure of FIG. 4 is modified in the manner illustrated in FIG. 5.

According to FIG. 5, the basic structure of the procedure of FIG. 4 is retained. However, steps S3 and S4 are dispensed with. Instead, a further step S16 is executed when the procedure jumps back from step S15 to step S5. In step S16, the evaluation device 13 adapts the position in which a two-dimensional image B is next captured during step S5. In this case, step S16 is adapted on the basis of the shifts which were required during step S9. In the procedure according to FIG. 5, the evaluation device 13 is therefore synchronized each time prior to a two-dimensional image B being captured.

Reliable capturing and objective evaluation of the condition of the conveyor belt 6 are possible using the apparatus according to the invention. The disadvantages of the prior art can be almost entirely avoided.

What is claimed is:

1. An apparatus for identifying the condition of a conveyor belt having a plurality of successive belt sections, comprising:
   means for assigning to each conveyor belt section an associated two-dimensional reference image;
   a capturing device for capturing two-dimensional images of the successive belt sections of the conveyor belt during operation of the conveyor belt,
   an evaluation device having a data-processing connection coupled with the capturing device for transmission of captured two-dimensional images, and
   wherein the evaluation device is designed in such a way that it compares the two-dimensional images with the assigned two-dimensional reference images which are associated with the belt sections, determines at least one statement about the condition of the belt on the basis of the comparison, and outputs the statement about the condition of the belt.

2. The apparatus according to claim 1, wherein the capturing device has an associated radiation source whose radiation can be captured by the capturing device.

3. The apparatus according to claim 2, wherein the capturing device and the radiation source are arranged on the same side of the conveyor belt.

4. The apparatus according to claim 2, wherein the capturing device and the radiation source are arranged on different sides of the conveyor belt, and in that the radiation emitted by the radiation source penetrates the conveyor belt.

5. The apparatus according to claim 1, wherein the evaluation device is formed in such a way that it is synchronized with the conveyor belt at least once per revolution of the conveyor belt.

6. The apparatus according to claim 5, wherein the evaluation device is formed in such a way that it is automatically synchronized on the basis of the comparison of the captured two-dimensional images with the two-dimensional reference images.

7. The apparatus according to claim 1, comprising a synchronization element which can be used to detect when at least one predetermined belt section passes the synchronization element, and wherein the synchronization element and the evaluation device have a data-processing connection in order to transmit a corresponding synchronization signal to the evaluation device.

8. The apparatus according to claim 1, wherein the capturing device is arranged in such a way that the two-dimensional images captured by the capturing device show the corresponding belt sections in the condition without bulk material.

9. The apparatus according to claim 1, wherein the evaluation device outputs the statement about the condition of the belt to a control device for the conveyor belt.

10. The apparatus according to claim 1, wherein the evaluation device transmits the statement about the condition of the belt to an operator control computer.

11. The apparatus according to claim 1, wherein the evaluation device activates an output device as a function of the statement about the condition of the belt, wherein a person can directly perceive the output signal from said output device.

12. The apparatus according to claim 1, wherein the statement about the condition of the belt is an alarm, a statement about the degree of wear, damage to the belt, remaining service life and/or soiling of the conveyor belt.

13. The apparatus according to claim 1, wherein the evaluation device locates significant deviations in the captured two-dimensional images between said captured two-dimensional images and the two-dimensional reference images and outputs the locations of the significant deviations.

14. The apparatus according to claim 1, wherein the captured two-dimensional images and the two-dimensional reference images are pictures, and wherein the evaluation device is designed in such a way that it identifies corresponding structures in the captured two-dimensional images and the two-dimensional reference images and shifts and/or rotates the captured two-dimensional images in relation to the two-dimensional reference images before they are compared with said two-dimensional reference images, with the result that the corresponding structures coincide with one another.

15. A method for identifying the condition of a conveyor belt having a plurality of successive belt sections, comprising the steps of:
   assigning to each conveyor belt section an associated two-dimensional reference image;
   capturing two-dimensional images of the successive belt sections of the conveyor belt during operation of the conveyor belt,
   comparing the two-dimensional images with the two-dimensional reference images which are associated with the belt sections,
   determining at least one statement about the condition of the belt on the basis of the comparison, and
   outputting the statement about the condition of the belt.

16. The method according to claim 15, comprising the step of detecting when at least one predetermined belt section passes a synchronization element whereupon a synchronization signal is generated.

17. The method according to claim 15, wherein the step of capturing captures the corresponding belt sections in the condition without bulk material.

18. The method according to claim 15, wherein the statement about the condition of the belt is an alarm, a statement about the degree of wear, damage to the belt, remaining service life and/or soiling of the conveyor belt.

19. The method according to claim 15, further comprising the step of locating significant deviations in the captured two-dimensional images between said captured two-dimensional images and the two-dimensional reference images and outputting the locations of the significant deviations.

20. The method according to claim 15, wherein the captured two-dimensional images and the two-dimensional reference images are pictures, and wherein corresponding structures in the captured two-dimensional images and the two-dimensional reference images are identified and the captured two-dimensional images in relation to the two-dimensional reference images are shifted or rotated before they are compared with said two-dimensional reference images, with the result that the corresponding structures coincide with one another.

* * * * *